INVENTORS
WILLIAM B. ZELINA
JAMES L. BUCHANAN

THEIR ATTORNEY

United States Patent Office 3,396,338
Patented Aug. 6, 1968

3,396,338
INSTRUMENT-TYPE TRANSFORMERS FOR UNI-DIRECTIONAL CURRENT CIRCUITS
James L. Buchanan, McKean, and William B. Zelina, Erie, Pa., assignors to General Systems Inc., a corporation of Pennsylvania
Continuation-in-part of application Ser. No. 298,106, July 29, 1963. This application Oct. 2, 1967, Ser. No. 672,128
30 Claims. (Cl. 324—117)

ABSTRACT OF THE DISCLOSURE

A transformer for use with unidirectional current circuits wherein a magnetic core is arranged for magnetization in one direction during one portion of a cycle of operation from a direct current source and during the other portion of the cycle is arranged for magnetization in the opposite direction from current in an external unidirectional current circuit which is magnetically coupled to the core so that an output means associated with the magnetic core is energized to produce an output which is proportional to the current in the unidirectional current circuit.

---

This application is a continuation in part of application Ser. No. 298,106 now abandoned, filed July 29, 1963.

This invention relates generally to instrument transformers for use with unidirectional current circuits. Transformers of this type for use with A.C. circuits are well known and have conventionally been designated merely as instrument transformers, the two kinds of which are commonly known as current transformers and potential transformers. The terms "unidirectional current instrument transformer," "unidirectional current transformer" and "unidirectional potential transformer," therefore, are used herein and in the appended claims to distinguish the devices of the present invention from the well known instrument transformers used with A.C. circuits.

The voltages, currents, and power loads found in electrical systems of different voltages and ratings vary between wide limits. There are many instances where it is desirable that the indicating or control circuits be isolated from the power circuit and this is especially so in the case of high voltage or high current carrying circuits. This can, of course, be readily accomplished when A.C. circuits are involved by means of the simple and well known instrument transformer. Such instrument transformers, therefore, have been widely used in A.C. instrumentation and control systems. The advantages offered by this simple device include electrical isolation from the A.C. circuit and efficient, versatile and proportional conversion of large A.C. currents and voltages to signals of convenient magnitude compatible with the particular instrumentation or control system being considered.

When unidirectional current circuits are involved, however, the simple known instrument transformers so useful with A.C. circuits cannot be employed. Heretofore, therefore, where electrical isolation of the indicating or control circuits from the unidirectional current power circuits was desired (and a mechanical output could not be tolerated) the complicated and expensive current measuring reactor (CMR) or voltage measuring reactor (VMR) was usually employed. The foregoing measuring reactors provided for the desired electrical isolation and proportional conversion or large unidirectional currents or voltages to signals or convenient magnitude. Because of the size, cost, and complexity, as well as the requirement that an A.C. supply be available, such measuring reactors have not been entirely satisfactory for a great many applications.

For example, the D.C. counterpart of the A.C. current transformer is the current measuring reactor (CMR). It is widely used to obtain a signal proportional to a large D.C. current and electrically isolated from it; however, the current measuring reactor is much more complicated and about twice the size and cost of the conventional current transformer. That is, the current measuring reactor requires two saturable reactors and an A.C. supply to drive them. Since in a D.C. system no such A.C. supply exists, either an alternator or inverter must be provided. The current measuring reactor, its use and operation is described in more detail in the book entitled "Magnetic Amplifiers" by H. F. Storm published by John Wiley and Sons Inc. New York (1955).

When a mechanical output can be tolerated, magnetic circuits have been employed where the magnetic force resulting from the D.C. current is applied to an armature. This force on the armature is made some function of applied D.C. current. The Hall effect crystal has also been used with some success but outputs are limited in power and sensitive to temperature variation when presently available crystals are used.

The present invention provides a solution of this old and common problem described herein. For example, the device of this invention differs from the current measuring reactor in that it requires no A.C. supply, but instead can operate from a D.C. voltage source, and requires only one magnetic core rather than the two required by the current measuring reactor. Thus, the cost and size are reduced.

It is an object of this invention, therefore, to provide a new and improved transformer for use with unidirectional current circuits.

It is another object of the invention to provide a new and simpler arrangement for isolating indicating and control circuits in unidirectional current electrical systems.

It is yet another object of the invention to provide a portable instrument of the "clamp-on" type for measuring unidirectional current.

It is a further object of the present invention to provide an improved D.C. ammeter.

Another object of the invention is to provide a D.C. current measuring device.

A still further object of the invention is to provide a D.C. ammeter which is simple in construction, economical to manufacture, and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

The operation of the transformers of the present invention—as, of course, also the operation of the measuring reactor and the A.C. type instrument transformer—is based on the law of equal ampere-turns. The present invention, however, provides a new device which combines, in a unique and simple manner, the modes of operation of the measuring reactor and the A.C. type instrument transformer. The new device so provided approaches the simplicity of the A.C. type instrument transformer while producing the unusual and surprising consequence of being capable of providing electrical isolation and the versatile and proportional conversion of large unidirectional currents or voltages to signals of convenient magnitude, as well as, for measuring or indicating the magnitude of such currents or voltages.

Thus, the transformers of the present invention operate during one portion of the operating cycle in the mode and manner of the simple A.C. type instrument transformer and during the other portion of the cycle in the mode and manner of the measuring reactor. For convenience, therefore, these two different modes of operation will be referred to hereinafter as the "CT Portion" or the "CT Half-cycle" and the "CMR Portion" or the "CMR Half-cycle."

In the particular embodiments of the invention selected for illustration and detailed description herein, a load means is caused to be energized during one portion of the operating cycle by simple transformer action in an amount determined by the ampere-turns magnetically coupled from an external circuit to the magnetic circuit of the transformer. During the other portion of the cycle the load is caused to be energized from a suitable source of D.C. potential through means which allows for such energization until the number of ampere-turns applied by such means to the magnetic circuit equals those applied thereto from the external circuit.

Figure 1:
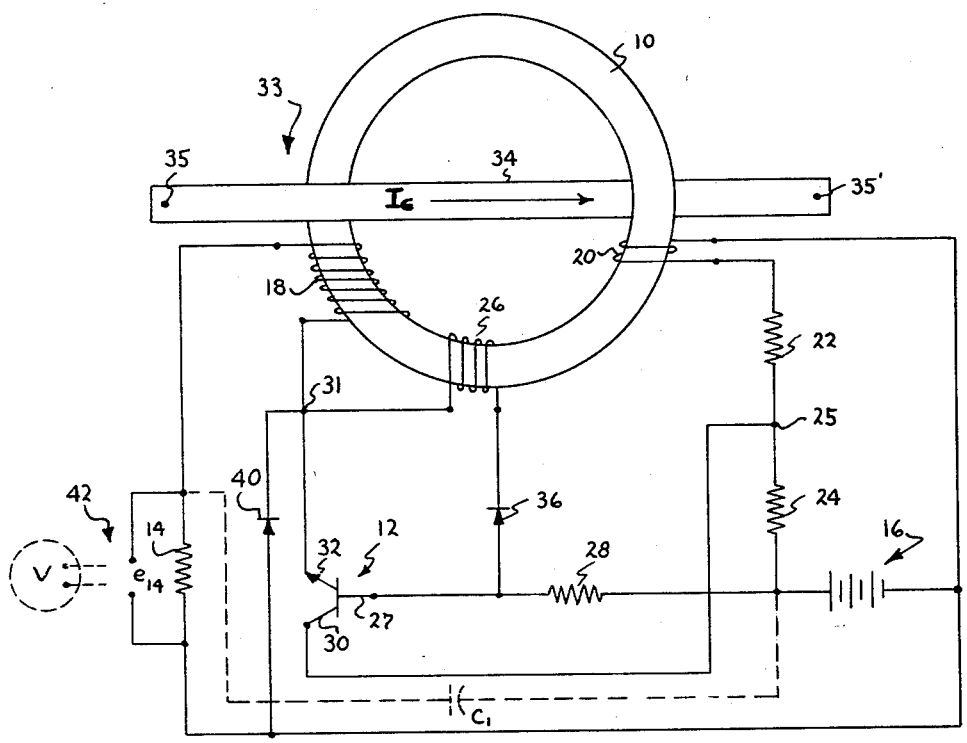
FIGURE 1 is a schematic circuit diagram of one embodiment of the present invention.

A transformer constructed in accordance with the present invention is shown in FIGURE 1. It has as its principal components a magnetic core 10, a switch means 12, a load means 14, and a suitable source of potential 16 which is connectable to supply energization to the load means 14 by a path which includes the switch means 12 and a winding 18 on the core 10. The foregoing components are interconnected with a suitable input means linking core 10 and with means to sense the magnitude of the flux change in the core and cause actuation of the switch means 12 to cause an equal and opposite flux change.

Preferably, for those applications where the current in the external circuit could have zero value, means are provided to establish a given operating condition in the core. For example, with zero current in the external circuit the transformer tends to operate on a miner loop of the hysteresis characteristic—between its residual point $B_R$ and saturation $B_S$—causing it to oscillate at a very high frequency. The given operating condition for the core 10 may be very conveniently provided by a bias winding 20 on the core 10 connected to the source of potential 16.

Also, sensing the amount of change of flux in core 10 may be very conveniently provided by sensing saturation of the core. As shown in FIGURE 1, saturation of core 10 is sensed by a feed-back winding 26 on the core which causes switching of switching means 12.

Figure 2:
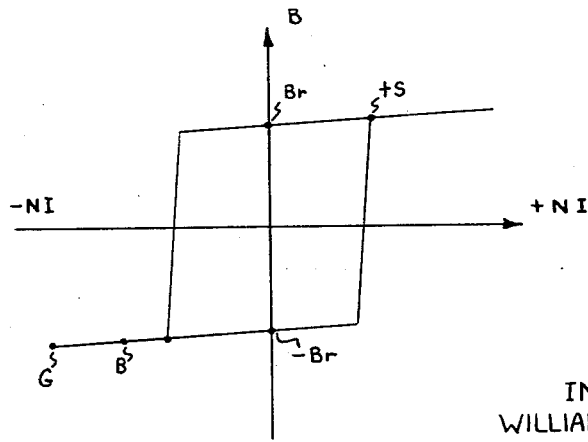
FIGURE 2 is a somewhat idealized hysteresis loop of core materials which may be utilized to advantage in this invention.

Core 10 may be made of any suitable material. When flux change is to be sensed by sensing saturation, the magnetic material employed in core 10 should preferably, though not necessarily, have a rectangular hysteresis loop (as shown in FIGURE 2). This is desirable because in such an arrangement saturation will be reached during each half-cycle of operation and the sensing of such saturation is utilized to signal the circuit to commence the following half-cycle. Thus, saturation should be very sharp. A somewhat idealized rectangular hysteresis loop for a typical material of this type is shown in FIGURE 2.

In FIGURE 1 the switch means 12 is illustrated as a transistor device and the source of potential 16 as a battery. For convenience, therefore, the arrangement of FIGURE 1 will be described in more detail with such specific devices. It will be understood; however, that the invention is not necessarily restricted to transistors or devices of any particular conductivity type and that other suitable switch means may be employed. For convenience in describing the concept of the invention, all embodiments of the invention have been illustrated and described with the transistor device arranged to be normally partially conducting. It will be understood by those skilled in the art, however, that a suitable arrangement may be provided wherein the transistor is arranged to be normally non-conducting. Also, although the schematic circuit diagram of FIGURE 1 illustrates a single turn winding in the input means thereof so as to function as a unidirectional current transformer, a multiturn winding (FIG. 5) may be employed whereby by suitable connection to the external circuit the transformer will function as a unidirectional potential transformer.

Referring again to FIGURE 1, the foregoing components are interconnected as follows. Bias winding 20 is connected to battery 16 through the series connected resistances 22 and 24. Resistances 22 and 24 also make up a voltage divider, the junction 25 of which is arranged to be switched by transistor 12 to the series combination of winding 18 and load means 14.

To this end, the base electrode 27 of transistor device 12 is connected through a suitable resistance 28 to one terminal of the battery 16. The collector electrode 30 is connected to the junction 25 of the voltage divider and the emitter electrode 32 is connected to the dot marked terminal of the winding 18, the other terminal of which winding is connected through the load means 14 to the other terminal of the battery.

The conventional dot notation is used herein to show the sense of the magnetic linkage of the various windings to the core. For example, positive (conventional) current flow into the dot marked terminal of a winding causes a voltage to be induced in each of the other windings linked to the core in a direction to make the dot marked terminal of any other winding positive with respect to the unmarked terminal of that other winding. Such a current will also be referred to herein as one which produces positive ampere-turns. Conversely, such current flow out of the dot marked terminal of a winding produces negative ampere-turns.

The transformer also has an input means 33, which may comprise a single or multi-turn winding, linking the core. As shown in FIG. 1, input means 3 includes a single turn winding, shown as the bus 34, linking the core 10. The input means 33 is adapted to be connected to the external circuit, as by the terminals 35–35' in such manner that current from the current carrying means of the external circuit flows in bus 34 in a desired direction. Thus, the current flowing in bus 34 is the current in the external circuit, the magnitude of which is to be measured, indicated or, after conversion to a convenient magnitude, utilized in some desired manner.

Since for the particular arrangement shown, positive current flows out of, rather than into, the dot marked terminal of bias winding 20, negative ampere-turns are applied thereby to the core 10 and an operating point, as shown at —B on the idealized rectangular hystersis loop shown in FIGURE 2, is established for core 10. It is also desired that the current flowing in bus 34 apply a magnetizing force to core 10 in the same direction as that of bias winding 20. Accordingly, the input means of the transformer is to be connected to the external circuit so that the current thereof flows in bus 34 out of the dot marked terminal. That is, current $I_G$ in bus 34 is to flow in the direction shown by the arrow. Thus, current flow in bus 34 applies a magnetizing force to core 10 in the same direction as that applied by bias winding 20 the magnitude of which magnetizing force is determined by the magnitude of such current. As indicated previously, for those applications where the current in the external circuit will always have a value other than zero, the use of bias winding 20 may be dispensed with; the current $I_G$ functioning always to 'reset" core 10.

The dot marked terminal of feed-back winding 26 is connected through a suitable rectifier device 36 to base electrode 27 of the transistor device and the other terminal of winding 26 is connected to the common junction 31 between the emitter electrode 32, the dot marked terminal of winding 18 and the unmarked terminal of winding 26. In order to provide a return path for the load current during one portion (CT Portion) of the operating cycle, a rectifier device 40 is provided across the series combination of winding 18 and load means 14.

As previously indicated, the transformer of the present invention has a novel operating cycle made up of two portions—a CMR portion and a CT portion. While the operation of the A.C. type current transformer of the prior art is well known and understood, it may be useful to very briefly review the operation of the prior art current measuring reactor (CMR) as an aid in more fully understanding the concept and modes of operation of the unidirectional current transformer of FIGURE 1.

Figure 3:
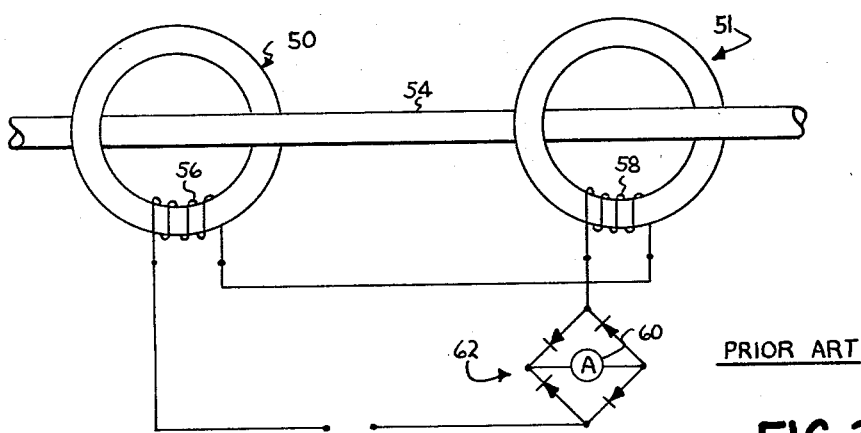
FIGURE 3 is a simplified schematic circuit diagram of a typical prior art current measuring reactor (CMR)

As shown in FIGURE 3 the prior art current measuring reactor includes two toroidal reactors 50 and 51 assembled on a bus bar 54 which carries the current to be measured. An input from a suitable A.C. supply is connected as shown to the windings 56 and 58 arranged, respectively, on the cores of reactors 50 and 51. Reactors 50 and 51 are thus connected so that the direct current through the main bus bar 54 produces a flux in opposite directions in each of the cores. The current in bus 54, therefore, operates to bias the cores of the reactors to opposite saturation relative to the alternating current. Accordingly, during one-half cycle of the A.C. supply the fluxes in a given core are aiding and during the other half cycle thereof the fluxes are opposing. Alternating current ampere-turns have to be established equal to the ampere-turns provided by the current in bus 54 before flux can change to limit further flow of alternating current. The amount of alternating current ampere-turns is therefore proportional to the ampere-turns in the current carrying bus 54. The ratio of the current measured by the meter 60 connected in the rectifier bridge 62 to the current in bus 54 is approximately in the ratio of the number of turns in bus 54 to the number of turns in winding 56 or 58.

Returning again to FIGURE 1 and describing the operation thereof, let it be assumed, initially, that the current $I_g$ in bus 34 is zero, no flux is changing in core 10 and that bias winding 20 has applied negative ampere-turns to core 10 to establish a flux density therein as indicated by the negative saturation point —B in FIGURE 2. With no flux changing in the core 10, current can flow from the positive terminal of the battery through resistance 28 and hence to junction 31 in two paths. One path is through the base-emitter circuit of the transistor device and the other path is through the rectifier device 36 and feed-back winding 26. The current flowing in the emitter-base circuit of the transistor device provides base drive therefor to cause the transistor to be partially conductive, causing a much larger current to flow through the collector-emitter circuit of the transistor to supply energization to the series combination of winding 18 and load means 14.

Since with the transistor device conductive positive current flows into the dot marked terminal of the winding 18, positive ampere-turns are applied by winding 18 to core 10 causing the flux therein to be driven from the biased condition, indicated at —B in FIGURE 2, toward positive saturation +S. Also, this positive current flow into the dot marked terminal of winding 18 causes a voltage to be induced in feed-back winding 26 in a direction to make the dot marked terminal of winding 26 positive with respect to its unmarked terminal to thereby force all of the current flowing through resistance 28 to flow through the base-emitter circuit of the transistor, switching such transistor fully on.

With the transistor switched fully on, the flux in core 10 is driven into positive saturation (+S in FIGURE 2). Since there is reduced inductance when core 10 saturates, there will be a sharp increase in current in the emitter-collector circuit of the transistor, and hence in winding 18 and load means 14. Ideally, this increased current would persist only until the current in the emitter-collector circuit reached a value such that feed-back winding 26 could no longer maintain the base drive required to keep the transistor switched fully on, which by suitable design may be made a very short time. When this occurs, the transistor returns to its only partially conducting condition provided by the base drive current through resistance 28. As a practical matter, this increased current persists for some time longer due to the "storage time" characteristic of transistor devices. That is, even though the base drive is removed, a certain time (storage time) is required before the transistor achieves its nonconductive condition.

At the end of the storage time period the transistor device recovers to its partially conductive state and when it does the flux in the core reverses and starts back toward the positive residual flux density condition $(+B_r)$. This reversal of flux in core 10 now causes a small voltage to be induced in the feed-back winding 26 in a direction to make the dot marked terminal thereof negative with respect to the unmarked terminal. This induced voltage causes the transistor device to become even less conductive thereby reducing the current winding 18. Also, in accordance with Lenz's Law, since current is decreasing, the induced voltage in winding 18 reverses and acts in the same direction as the applied voltage to tend to maintain the current in the circuit. Thus, there is a regenerative action which quickly causes the transistor device to be switched completely off. With the transistor device nonconductive, current in bias winding 20 applies a magnetizing force to drive the flux in the core in the negative direction to the point —B in FIGURE 2. The process of going into saturation terminates the induced voltage in winding 26 since the magnetic flux in the core no longer varies when the saturated portion of the core hysteresis characteristic is reached. Accordingly, transistor 12 again becomes partially conductive, due to the base drive applied through resistance 28, and the foregoing described cycle is repeated.

From the foregoing it can be seen that in the circuitry illustrated the feed-back winding 26 operates to sense the magnitude of flux change in core 10 by sensing positive saturation and causing actuation of the switch means to one condition and then sensing negative saturation and causing actuation of the switch means to the other condition. Since the flux change from positive saturation to negative saturation is equal in amount to the flux change from negative saturation to positive saturation, the feedback winding 26 provides a very simple and convenient means of sensing the magnitude of the flux change in the core 10 and causing actuation of the switch means to cause an equal and opposite flux change. Thus, saturation of the core operates to terminate one portion of the cycle and commence the other portion and with power being fed to the output circuit during the periods when the core is being saturated. During one portion of the cycle this power is provided by transformer action and during the other portion of the cycle the power is provided from the source of potential 16 through the switch means 12.

Figure 4A:
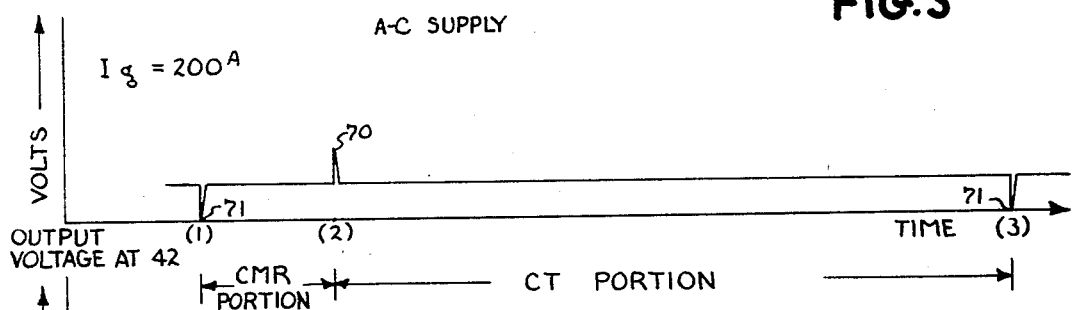
FIGURES 4A through 4C show waveforms of the output for different levels of input.
Figure 4B:
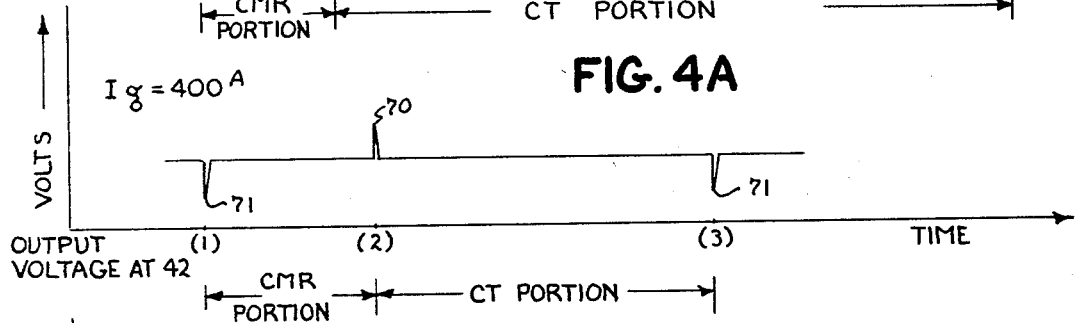
Figure 4C:
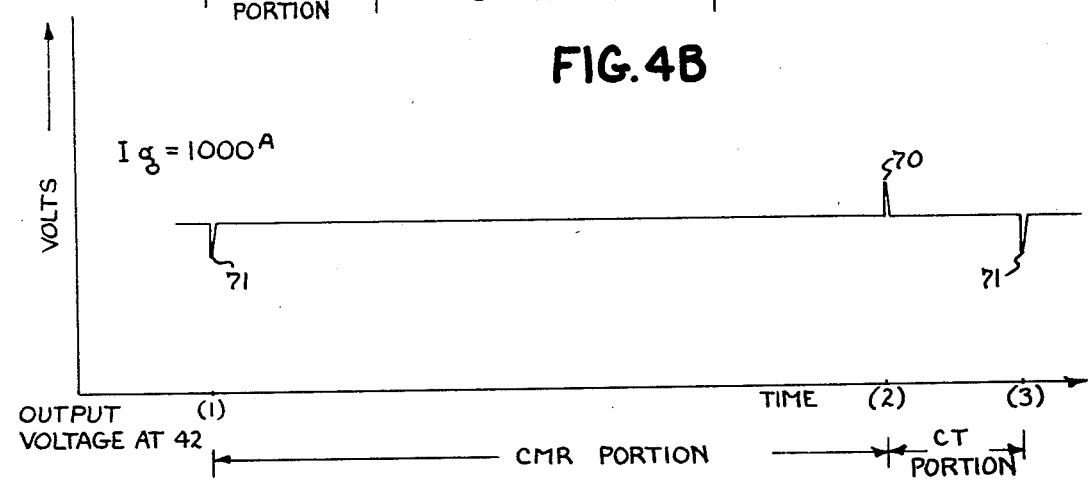

In FIGURES 4A through 4C there are shown waveforms of the voltage appearing at the output means 42 which explain the manner of operation of the transformer. The waveforms shown in FIGURE 4A represent the output for one value of the current $I_g$ (e.g. 200 amperes). In FIGURE 4A the portion between points 1 and 2 represents the time during which load means 14 is being energized from the potential source 16 through the transistor. Stated more simply, the portion between the points 1 and 2 represents the period of the cycle during which the transistor is "on." This portion is referred to for convenience as the "CMR" portion, or the "CMR" half-cycle, because during this portion of the cycle the transformer behaves essentially like a measuring reactor. The spike 70 at the end of this CMR portion results from the foregoing described sharp increase in current in the transistor when the transformer reactive impedance is reduced at saturation of the core. The portion between the points 2 and 3, on the other hand, represents the time during which the transistor device is "off" and the flux in the core is being driven from positive saturation to negative saturation (point $-B$) by the ampere-turns of bias winding 20. Since this is also the direction in which the flux in the core will be driven ("reset") by the ampere-turns of bus 34 to cause energization of the load means 14 by simple current transformer action, this portion of the cycle is referred to for convenience as the "CT" portion, or the "CT" half-cycle, because of the fact that during this portion of the cycle the transformer behaves essentially like the simple A.C. type current transformer. The dip 71 at the end of this CT portion is due to saturation of the core. Any undesirable effects of the foregoing spike and dip can be obviated by suitable filtering.

For the arrangement shown in FIGURE 1, where core 10 is biased to a given condition ($-B$ in FIGURE 2), the foregoing described free-running mode of operation of the transformer results in some output at output means 42 even though the current $I_G$ is zero. This output, from the Law of Equal Ampere-turns (and neglecting exciting ampere-turns) may be defined as follows $$I_C N_{18} = I_B N_{20}$$

or $$I_C = I_B \left(\frac{N_{20}}{N_{18}}\right)$$

where:

$I_C$ = current in winding 18—and also, of course in load means 14.
$I_B$ = current in bias winding 20.
$N_{20}$ = number of turns of winding 20.
$N_{18}$ = number of turns of winding 18.

while in a wide variety of practical applications this zero, or quiescent, output is of no concern, for some applications, such as when the transformer is used for instrumentation, it may be desirable to adjust in out. For example, if the utilization means connected to output means 42 is a meter, the meter is merely zeroed for this quiescent output so that true output is indicated on the meter.

When current $I_G$ flows in bus 34 of the transformer input means 33 in the direction indicated by the arrow, the resulting ampere-turns add directly to the biasing ampere-turns. That is, the magnetizing force applied to core 10 as a result of the current $I_G$ is in the same direction as that due to the bias winding 20.

For example, current $I_G$ in single turn winding 34 causes a voltage to be induced in windings 18 and 26. The voltage induced in winding 26 is in a direction to turn the transistor device off so that no energization is supplied to load means 14 from the source of potential 16. Because of the return path provided by rectifier device 40, however, load means 14 is supplied energization from the induced voltage in winding 18. That is, during this portion of the cycle load means 14 is supplied energization by simple transformer action, hence the term "CT" portion.

Once the core 10 has been driven to negative saturation by the foregoing current $I_G$, there is no longer changing flux and, therefore, no induced voltage in winding 18 to cause energization of load means 14 and no induced voltage in feed-back winding 26 to keep the transistor device turned off. Moreover, the magnitude of the current $I_G$ in bus 34 will determine how far out into the negative saturation region the core 10 will be driven. For a given value of $I_G$, for example, the core 10 may be driven to a point such as that indicated at G in FIGURE 2.

Accordingly, with no flux changing in core 10 and thus no induced voltage in feed-back winding 26 to keep the transistor device turned off, current can flow through the transistor device from the source of potential 16 to supply energization to the series combination of winding 18 and load means 14. As shown previously, this positive current flowing into the dot marked terminal of winding 18 applies positive ampere-turns to the core and causes a voltage to be induced in feed-back winding 26 to turn the transistor fully on until positive saturation is reached at which time the opposite polarity voltage induced in winding 26 by the reversal of flux in the core causes the transistor to be turned completely off. With the transistor device turned off the flux in the core will be reset by the ampere-turns due to winding 34 (and winding 20 if such a bias winding is employed) to the point G in the negative saturation region in FIGURE 2. Since with core 10 in its saturation region there will be no induced voltage in feed-back winding 26 to keep transistor device 12 off, the transistor device turns on and energization is supplied therethrough to the series combination of the winding 18 and load means 14.

Until sufficient ampere-turns are produced by the current flowing in winding 18 from battery 16 equal to the ampere-turns due to the current $I_G$ in bus 34 (plus the ampere-turns of winding 20 if a bias winding is employed), there will be no ampere-turns available to cause the flux in the core to be moved from negative saturation toward positive saturation. Moreover, until positive saturation is reached and the reversal of flux thereafter causes a voltage to be induced in feed-back winding 26 in a direction to turn the transistor off, the load means 14 continues to be energized from the battery 16 through winding 18 and the transistor. This is essentially the mode of operation of a measuring reactor. The transistor device, therefore, remains conductive and supplies energization to the series combination of winding 18 and load means 14 during the CMR portion of the cycle in an amount essentially equal to that supplied by bias winding 20 and the single turn winding 34 by transformer action during the CT portion of the cycle.

Thus, stated very simply, during one portion of the operating cyle, load means 14 is supplied energization by means of winding 18 and the voltage induced in such winding due to the current $I_G$ and during the other portion of the cycle, load means 14 is supplied energization by means of winding 18 and the voltage of battery 16. Since the voltage induced in winding 18 is proportional to the current $I_G$, the total amount of energization supplied to load means 14 over a complete cycle of operation is also proportional to the current $I_G$. Accordingly, a continuous output is available at output means 42 which is proportional to the current $I_G$.

The current $I_C$ in winding 18—and load means 14—may be defined as follows, again neglecting exciting ampere-turns:

$$I_C N_{18} = I_B N_{20} + I_G N_{34}$$

or $$I_C = I_B \left(\frac{N_{20}}{N_{18}}\right) + {}_G\left(\frac{N_{34}}{N_{18}}\right)$$

Since winding 34 is a single turn ($N_{34}=1$), the current $I_C$ may be set forth more simply as $$I_C = I_B \left(\frac{N_{20}}{N_{18}}\right) + \frac{I_G}{N_{18}}$$

From the foregoing it can be seen that the currents in windings 34 and 18 vary inversely as the number of turns. That is, the current ratio is inversely proportional to the number of turns. This proportionality permits the measurement of large unidirectional currents. Such measurement may be conveniently accomplished, for example, by connecting a voltmeter, shown in phantom, to the output means 42. The transformer may also be utilized to provide current limit and short-circuit protection. Moreover, there are no non-linearities in the transfer function which are dependent on the shape of the magnetic hysteresis loop.

In the foregoing equations the effect of exciting and feed-back currents have been neglected in order to simplify the explanation. The following complete, rigorous equation, including the effects of such currents, shows that, since the exciting and feed-back currents are very small, a negligible error will be introduced even if their effects were to be ignored completely.

For example, let $I_E N_{18}$ be exciting ampere-turns; $I_F$ be the feed-back current; $T_{(CMR)}$ the time duration of the CMR half-cycle and $T_{(CT)}$ the time duration of the CT half-cycle.

For the CMR portion of the operation, no feed-back current flows and the instantaneous output may be defined as follows:

$$I_B N_{20} + I_G = I_C N_{18} - 1_E N_{18}$$

or $$I_C = I_B \left(\frac{N_{20}}{N_{18}}\right) + \frac{I_G}{N_{18}} + I_E$$

For the CT portion of the operation, the feed-back current is simply $V_1/R_3$, where $V_1$ is the potential of the source 16. The output for this portion is then defined as follows:

$$I_C N_{18} + I_F N_{26} = I_B N_{20} + I_G - I_E N_{18}$$

or $$I_C = I_B \left(\frac{N_{20}}{N_{18}}\right) + \frac{I_G}{N_{18}} - I_E - I_F \left(\frac{N_{26}}{N_{18}}\right)$$

From the foregoing a complete expression for the average output then becomes $I_C(\text{total}) =$ $$\frac{1}{T_{(CMR)} + T_{(CT)}} \left[ T_{(CMR)} \left( I_B \left(\frac{N_{20}}{N_{18}}\right) + \frac{I_G}{N_{18}} + I_E \right) + T_{(CT)} \left( I_G \left(\frac{N_{20}}{N_{18}}\right) + \frac{I_G}{N_{18}} - I_E - I_F \left(\frac{N_{26}}{N_{18}}\right) \right) \right]$$

For a typical transformer the exciting ampere-turns would always be small compared to the ampere-turns of winding 18. For example, in one particular transformer constructed in accordance with this invention the total exciting ampere-turns were about two (2) and those due to winding 18 about two thousand (2000). Hence, $I_E$ was only about 0.001 ampere. Inspection of the foregoing equation, therefore, shows the validity of neglecting exciting currents.

Also, for a reasonable gain transistor, feed-back current $I_F$ would also always be small. For example, in the particular transformer referred to above the feed-back current was about 0.004 ampere and winding 26 had about 200 turns. Thus, the expression $$I_F \left(\frac{N_{26}}{N_{18}}\right)$$

evaluates as 0.004 ampere.

Also, in that particular transformer, winding 20 had about 200 turns and the current $I_B$ was about 0.2 amperes so that the expression $$I_B \left(\frac{N_{20}}{N_{18}}\right)$$

evaluates at about 0.0010 amperes. It is this value of bias current $I_B$, therefore, which produces the quiescent of zero output. As indicated hereinabove this can be easily adjusted out, although for a great many applications such output is of no concern.

The peaks 70 and dips 71 which appear in the waveforms shown in FIGURES 4A through 4C may be smoothed out of the output, if desired, by means of any suitable filter arrangement. One convenient and simple arrangement utilizes a capacitance $C_1$ connected, as shown in phantom, from the positive side of the source of potential 16 to the unmarked terminal of winding 18. Such capacitance effectively transiently constrains the output to the steady state level without introduction of error.

Figure 5:
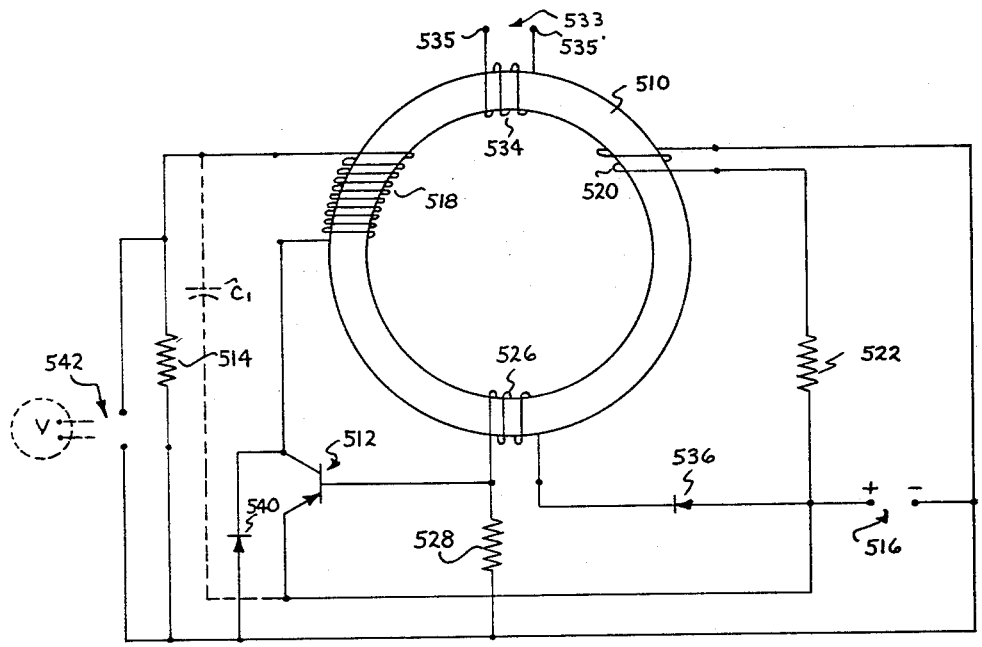
FIGURE 5 is a schematic circuit diagram of the transformer of FIGURE 1 for use with a transistor device of opposite conductivity type.

In the arrangement shown in FIGURE 1 switch means 12 is illustrated as a transistor device of the N-P-N type. In FIGURE 5 there is shown a complementary arrangement where the switch means 12 is a transistor device of the P-N-P type. The arrangement of FIGURE 5 is similar to that of FIGURE 1 and has the same mode of operation. As shown in FIGURE 5, the single resistance 522 replaces the voltage divider resistance 22 and 24 of FIGURE 1 and resistance 528 is connected in series with feed-back winding 526 and the diode 536. The base electrode of the PNP transistor device 512 is connected to the junction between the unmarked terminal of feed-back winding 26 and one end of the resistance 528, the other end of which is connected to the negative side of the source of potential 516. Also, the series combination of the winding 518 and load means 514 is connected to the source of potential 516 through the collector-emitter circuit of the transistor. Again, a capacitance $C_1$, shown in phantom, may be connected from the load means voltage to the source of potential 516. That is, capacitance $C_1$ is connected from the positive side of the source of potential to the unmarked terminal of winding 518 to provide filtering of the peaks and dips. The operation of the foregoing arrangement is the same as that of FIGURE 1.

In FIGURE 5 the input means 533 is shown as including a multi-turn winding 534 rather than the single turn winding (bus 34) of FIGURE 1. If multi-turn winding 534 is connected in series with some resistor across a unidirectional voltage to be measured the device becomes a unidirectional potential transformer and thus the counterpart of the voltage measuring reactor (VMR).

Figure 6:
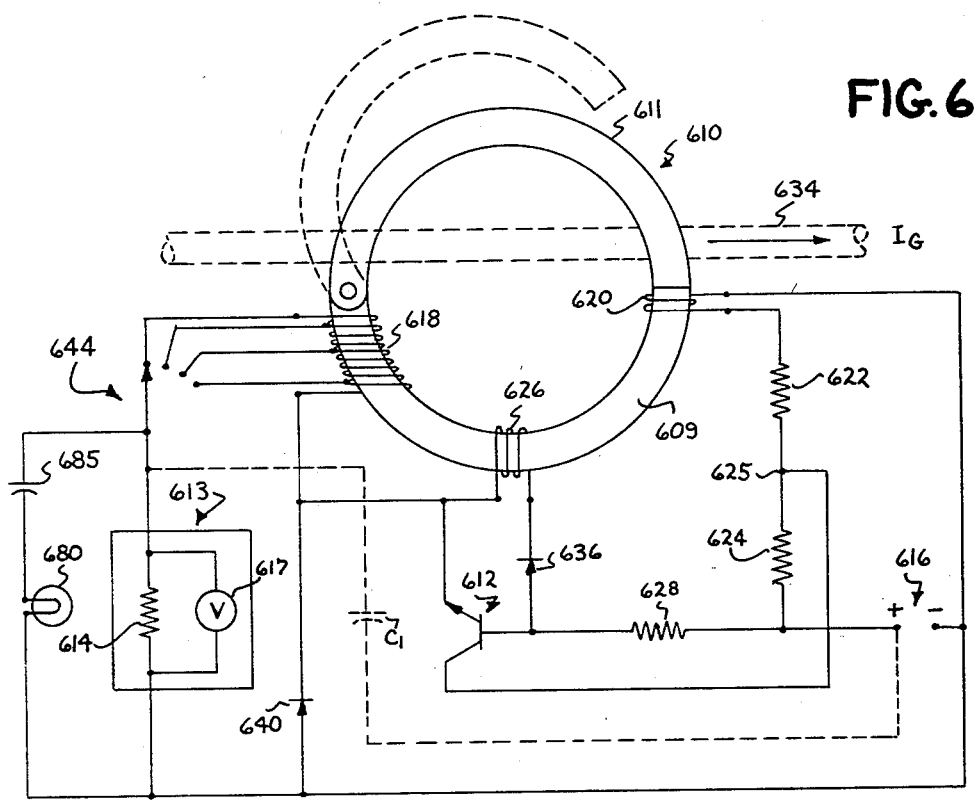
FIGURE 6 is a schematic circuit diagram of a new and improved portable, clamp-on type unidirectional current measuring device in accordance with another embodiment of the invention.

Also, as shown in more detail in FIGURE 6, the transformer of this invention may be utilized to provide a clamp-on type instrument for measuring the unidirectional current in a current carrying means of a circuit isolated from the instrument. As shown, to allow the core to be positioned about the current carrying means of the external circuit, the current in which is to be measured, the core 610 includes a stationary portion 609 and a movable portion 611. Any core arrangement which allows the current carrying means of the external circuit to be magnetically coupled to the core is, of course, suitable and the structure shown in FIGURE 6 is a well-known one widely used with clamp-on type A-C instruments.

When the core 610 is suitably positioned about the current carrying means of the external circuit, such current carrying means becomes a single turn winding linking the core. Thus, this current carrying means, shown in phantom at 634, becomes the equivalent of the single turn winding (bus 34) of the input means 33 in the arrangement of FIGURE 1. Current flowing in this current carrying means, therefore, applies a magnetizing force to the core. Accordingly, the operation of the arrangement illustrated in FIGURE 6 is identical to that previously described in connection with FIGURE 1. A suitable indicating means 613, shown as a voltmeter 617 connected across a load means 614 which is connected in series with winding 618, provides an indication of the magnitude of the current in the current carrying means about which the core 610 has been positioned. While the indicating means 613 has been illustrated as a voltmeter connected across the load means 614 it will be appreciated that a suitable ammeter may be itself connected in series with winding 18 so that no separate load means 614 need be included; the load means being already included in the ammeter itself.

Since currents to be measured vary between wide limits, it is desirable that the current measuring device have a wide indicating range. To this end, the arrangement shown in FIGURE 6 is provided with a suitable tap-changing means 644 operatively associated with the winding means 618. Tap changing means 644 functions to change the number of turns of winding 618 which link the core 610 and in this way changes the proportionality constant—and hence the range of the indicating means.

The current measuring device is electrically isolated from the circuit whose current is to be measured since there is no direct connection thereto but only a magnetic coupling. Also, the proportionality between the current in winding 634 and winding 618 permits the measurement of large unidirectional currents. Moreover, in the devices of the present invention, because of transformer action, the current in the load means has been found to be essentially a replica of the current in the current carrying means (634) irrespective of the wave shape of such current.

It is also often desirable to provide means for indicating the polarity of the current in the current carrying means (634) of the external circuit. To this end, there is provided a series combination of an indicator lamp 680 and a capacitance 685 connected across the load means 614. In operation, when the polarity of the unidirectional current in the external circuit is such that positive current flows into the dot—that is in a direction opposite that illustrated in FIGURE 6—the circuit will operate on a minor loop of the hysteresis loop of the core (between $+B_R$ and $+S$) producing high frequency oscillations. This A-C output will energize the lamp through capacitance 685. For the other polarity, that is, current flowing out of the dot as illustrated, the indicating means shows the magnitude of the current as described.

The arrangement illustrated in FIGURE 6 provides a new, unique, compact and readily portable, clamp-on unidirectional current measuring device. The compactness of the device allows for a complete unit to be made available having a size about equal to that of a standard flashlight, or even smaller. Battery operation makes the device readily portable. The provision of the tap-changing means associated with the winding 618 allows a multi-scale indicating means to cover a wide range. For example, a range of from 10 to 10,000 amperes may be very conveniently provided in a small and compact device. Simple zero adjustment before using the instrument to measure current in a circuit will adjust out the zero current output due to the free-running operation at zero input.

There has been shown and described herein a new and improved transformer for use with unidirectional current circuits. The transformer of this invention is useful in a wide range of applications among which are in control systems where current measuring reactors (CMR) and voltage measuring reactors (VMR) are presently employed, as a transducer of large currents and voltages, providing isolation of measuring and indicating or control circuits from the power circuit, providing current-limit and short-circuit protection as well as providing for the measurement of large unidirectional currents and voltages.

While only preferred embodiments of the invention and the best mode contemplated for carrying out the invention have been shown by way of illustration, many changes and modifications will occur to those skilled in the art. It is, therefore, to be understood that the appended claims are intended to cover all such changes and modifications as fall within the true spirit and scope of the invention.

What we claim as new and desire to secure by Letters Patent of the United States is:

1. A transformer for use with unidirectional current circuits, comprising:
   (a) a core of magnetizable material;
   (b) input means including a first winding means magnetically coupled to said core, said input means being connectable to a current carrying means of an external unidirectional current circuit so that unidirectional current flows in said first winding means in a direction to apply a magnetizing force to said core having a first direction;
   (c) a second winding means on said core;
   (d) means including a switch means for supplying energization to said second winding means from a source of potential said second winding being operative when so energized to apply a magnetizing force to said core having a direction opposite that of said first direction;
   (e) output means, said output means including a load means connected in series circuit relationship with said second winding means; and
   (f) means for sensing the magnitude of flux change in said core and causing actuation of said switch means for a period of time effective to cause an equal and opposite flux change in said core, actuation of said switch means being operative to connect and disconnect said second winding means and said source of potential whereby an output is developed at said output means which is proportional to the unidirectional current flowing in said first winding means with the proportionality constant being the ratio of turns of the second to the first winding means.

2. The transformer recited in claim 1 wherein said means for sensing the magnitude of the flux change in said core is a means for sensing the occurrence of saturation in said core.

3. The transformer recited in claim 2 wherein said means for sensing the occurrence of saturation in said core is a third winding means arranged to sense saturation of the core in one direction and actuate said switch means to its conductive state and to sense saturation of the core in the opposite direction and actuate said switch means to its nonconductive state.

4. The transformer recited in claim 1 including means to establish a given operating condition for said core in said first direction.

5. The transformer recited in claim 2 including means to establish a given operating condition for said core in said first direction.

6. The transformer recited in claim 3 including means to establish a given operating condition for said core in said first direction.

7. The transformer recited in claim 4 wherein said means to establish the given operating condition for said core is a winding arranged to be energized to apply a magnetizing force to said core in said first direction.

8. The transformer recited in claim 5 wherein said means to establish the given operating condition for said core is a winding arranged to be energized to apply a magnetizing force to said core in said first direction.

9. The transformer recited in claim 4 including a winding on said core operative to sense saturation thereof in one direction and cause actuation of said switch means to its conductive condition and to sense saturation of the core in the opposite direction and cause actuation of said switch means to its nonconductive condition.

10. The transformer recited in claim 9 wherein said means to establish a given operating condition for said core is a winding on said core arranged to be energized to apply a magnetizing force to said core in said first direction.

11. A unidirectional current measuring device comprising:
(a) a core of magnetizable material adapted to be positioned about a current carrying means of a unidirectional current circuit so that said current carrying means constitutes a first winding means magnetically coupled to said core whereby unidirectional current flow in said current carrying means is operative to apply a magnetizing force to said core having a first direction;
(b) a second winding on said core;
(c) means including a switch means for supplying energization to said second winding means from a source of potential, said second winding means being operative when so energized to apply a magnetizing force to said core having a direction opposite that of said first direction;
(d) means for sensing the magnitude of flux change in said core and causing actuation of said switch means for a period of time effective to cause an equal and opposite flux change in said core; and
(e) output means connectable in series circuit relationship said second winding means so that an output is developed at said output means which is proportional to the unidirectional current flowing in said first winding means and wherein the proportionality constant is the ratio of turns of the second to the first winding means.

12. The current measuring device recited in claim 11 wherein said output means includes an indicating means and a load means.

13. The current measuring device recited in claim 12 wherein said indicating and load means constitute an ammeter.

14. The current measuring device of claim 11 including means to establish an operating condition for said core in said first direction.

15. The current measuring device of claim 14 wherein said means to establish the operating condition for said core in said first direction is a winding on said core arranged to be energized from a source of potential to apply a magnetizing force to said core in said first direction.

16. The current measuring device of claim 14 wherein the means for sensing the magnitude of flux change in said core is a means for sensing the occurrence of saturation of said core.

17. The current measuring device of claim 16 wherein the means for sensing the occurrence of saturation in said core is a winding on said core arranged to cause actuation of said switch means to the conductive condition when the core exhibits saturation in one direction and to cause actuation of said switch means to the nonconductive condition when the core exhibits saturation in the opposite direction.

18. The current measuring device of claim 11 including tap changing means operatively associated with said second winding means to change the number of turns of said winding means linking said core to thereby change the proportionality constant.

19. The current measuring device of claim 12 including tap changing means operatively associated with said second winding means to change the number of turns of said winding means linking said core to thereby change the proportionality constant and hence the range of said indicating means.

20. The current measuring device of claim 19 wherein said indicating and load means constitute an ammeter.

21. The current measuring device of claim 17 including tap changing means operatively associated with said second winding means to change the number of turns of said winding linking said core to thereby change the proportionality constant.

22. The current measuring device of claim 21 including means for indicating the polarity of the current in said first winding means.

23. The current measuring device of claim 22 wherein said means for indicating the polarity of the current in said first winding means includes the series combination of a capacitance and a lamp connected across said output means.

24. The current measuring device recited in claim 19 wherein said core is of rectangular hysteresis loop material, said switch means is a transistor device and said source of potential is a battery.

25. The current measuring device recited in claim 24 including means for indicating the polarity of the current in said current carrying means, said means comprising the series combination of a capacitance and an indicating lamp connected across said output means.

26. A transformer for use with unidirectional current circuits comprising:
(a) a magnetic core;
(b) means for magnetically coupling said magnetic core to a current carrying means of an external unidirectional current circuit so that a first magnetizing force is applied to said magnetic core in a first direction;
(c) output circuit means magnetically coupled to said magnetic core, said output circuit means including a load means and a current path to allow said load means to be energized by transformer action due to said first magnetizing force;
(d) means including a switch means responsive to the occurrence of a predetermined magnitude of flux change in said core in said first direction for connecting said core for magnetization in a direction opposite said first direction from a unidirectional voltage source through said switch means and responsive to the occurrence of an equal and opposite flux change for disconnecting said core for magnetization from said unidirectional voltage source; and
(e) means for extracting an output which is proportional to the unidirectional current in the current carrying means of said external unidirectional current circuit.

27. The transformer recited in claim 26 wherein said output circuit means is magnetically coupled to said magnetic core by a first winding positioned thereon and said load means is connected in series circuit with said first winding.

28. The transformer recited in claim 27 wherein said switch means is a transistor device having a control circuit and a second winding arranged on said magnetic core is connected in said control circuit, said second winding sensing saturation of said core in said first direction and rendering said transistor to one condition and sensing saturation of said core in the opposite direction and rendering said transistor to the other condition.

29. The transformer recited in claim 28 including a third winding on said core arranged to be energized to apply a given magnetization force to said magnetic core in said first direction.

30. The transformer recited in claim 29 including means for measuring the current in said load means.

References Cited

UNITED STATES PATETNS

| | | | |
|---|---|---|---|
| 1,524,285 | 1/1925 | Besag | 324—117 |
| 1,677,191 | 7/1928 | Loynes. | |
| 2,146,555 | 2/1939 | Arey | 324—127 |
| 2,446,390 | 8/1948 | Rath | 324—120 |
| 2,905,906 | 9/1959 | Kittl. | |
| 2,919,416 | 12/1959 | Jones. | |
| 3,064,193 | 11/1962 | Grubb et al. | 324—120 |
| 3,199,051 | 8/1965 | Hills et al. | 331—117 XR |

OTHER REFERENCES

Moulton, C. H.; "Light pulse system shrinks high-voltage protection device."
Electronics; May 17, 1965; pp. 71 through 76; copy in 324-120.

RUDOLPH V. ROLINEC, *Primary Examiner.*

E. F. KARLSEN, *Assistant Examiner.*